(12) United States Patent
Yiu et al.

(10) Patent No.: US 12,030,217 B2
(45) Date of Patent: Jul. 9, 2024

(54) METHOD OF MARKING A DIAMOND, MARKINGS FORMED FROM SUCH METHODS AND DIAMONDS MARKED ACCORDING TO SUCH METHOD

(71) Applicant: MASTER DYNAMIC LIMITED, Hong Kong (CN)

(72) Inventors: Yau Chuen Yiu, Hong Kong (CN); Ka Wing Cheng, Hong Kong (CN); Koon Chung Hui, Hong Kong (CN)

(73) Assignee: MASTER DYNAMIC LIMITED, Hong Kong (CN)

( * ) Notice: Subject to any disclaimer, the term of this patent is extended or adjusted under 35 U.S.C. 154(b) by 0 days.

(21) Appl. No.: 17/624,332

(22) PCT Filed: Jul. 24, 2020

(86) PCT No.: PCT/CN2020/104587
§ 371 (c)(1),
(2) Date: Dec. 31, 2021

(87) PCT Pub. No.: WO2021/000967
PCT Pub. Date: Jan. 7, 2021

(65) Prior Publication Data
US 2022/0274291 A1 Sep. 1, 2022

(30) Foreign Application Priority Data

Jul. 2, 2019 (HK) .................. 19126201.3

(51) Int. Cl.
*B28D 5/04* (2006.01)
*B42D 25/324* (2014.01)
*B42D 25/435* (2014.01)

(52) U.S. Cl.
CPC ............. *B28D 5/04* (2013.01); *B42D 25/324* (2014.10); *B42D 25/435* (2014.10)

(58) Field of Classification Search
CPC .......... B28D 5/04; B28D 5/00; B42D 25/324; B42D 25/435; G06V 20/95; G06V 20/00; G06V 20/80
(Continued)

(56) References Cited

U.S. PATENT DOCUMENTS

| 4,467,172 A | 8/1984 | Ehrenwald |
| 2010/0054528 A1* | 3/2010 | Nizienko ................ G09F 7/165 382/100 |

(Continued)

FOREIGN PATENT DOCUMENTS

| CN | 1522422 A | 8/2004 |
| CN | 101827713 A | 9/2010 |

(Continued)

OTHER PUBLICATIONS

International Search Report and Written Opinion of International Searching Authority for International Application No. PCT/CN2020/104587.

(Continued)

*Primary Examiner* — Justin V Lewis
(74) *Attorney, Agent, or Firm* — JCIP; Joseph G. Chu; Jeremy I. Maynard

(57) ABSTRACT

A process of forming a non-optically detectable authentication marking (110), includes the step of: applying a marking at a surface of a diamond (200) using a focused ion beam (FIB) writing process so as to provide a non-optically detectable authentication marking (110) which is formed by alteration in the optical characteristics of a portion of the diamond material at the outer surface of the diamond to form a marked portion; wherein the marking is optically invisible, and wherein the marking is viewable by an imaging method which provides an observable contrast between the portion of the diamond having altered optical characteristics and the (Continued)

non-marked portion of the diamond. The marking process can assist in the prevention of the counterfeiting of precious articles, and be of assistance in the incident of theft. A marking, a diamond, a process of viewing a marking on a diamond are further disclosed.

15 Claims, 4 Drawing Sheets

(58) Field of Classification Search
USPC ........ 283/67, 70, 72, 74, 85, 87, 91, 94, 98, 283/901
See application file for complete search history.

(56) References Cited

U.S. PATENT DOCUMENTS

| | | | |
|---|---|---|---|
| 2016/0167164 A9* | 6/2016 | Rosario | B23K 26/0006 347/225 |
| 2017/0307537 A1 | 10/2017 | Yeung et al. | |

FOREIGN PATENT DOCUMENTS

| | | |
|---|---|---|
| CN | 109376832 A | 2/2019 |
| EP | 0984865 A1 | 3/2000 |
| EP | 2860003 A2 | 4/2015 |
| EP | 3131724 A1 | 2/2017 |
| RU | 2373307 C1 | 11/2009 |

OTHER PUBLICATIONS

Martin Andrew Draganski, "On the Opto-Electrical Properties of Ion-Implanted Single-Crystal Diamond in the Visible and Near-Visible Regime a Thesis Submitted in Fulfilment of the Requirements for the Degree of Doctor of Philosophy", Mar. 1, 2011 (Mar. 1, 2011), XP055105243.

Extended European Search Report dated Mar. 3, 2023 for European Application No. 20834358.2.

* cited by examiner

METHOD OF MARKING A DIAMOND, MARKINGS FORMED FROM SUCH METHODS AND DIAMONDS MARKED ACCORDING TO SUCH METHOD

TECHNICAL FIELD

The present invention relates to the field of marking of solid state materials, and more particularly to the marking of gemstones including diamonds.

BACKGROUND OF THE INVENTION

Gemstone identification and grading has been long-established by international standards laboratories including GIA, IGI, Gem-A and NGTC. The identification and grading result is typically stored in an electronic media such as hard-disks, tapes, compact discs and the like, and a paper certificate is issued along with the corresponding gemstone.

When the certificate is lost, or when the gemstone is mixed with other gemstones, the identity of the gemstone is lost, and is required to be recertified.

The direct marking of gemstones including diamonds is a generally straight-forward method to avoid such circumstance and allows for re-identification.

Conventional techniques within the art for the marking of gemstones including diamonds include laser marking and ion beam marking.

However, when using laser marking, this can generate coarse patterns and leave unrecoverable ablation marks on the gemstone, causing permanent damage and can devalue the gemstone.

When using ion beam marking, such a technique can be used to inscribe fine patterns on the surface of the gemstone which can be 1000 times smaller than those using laser marking, however the process is typically relatively slow and requires precision.

Other than item identification, gemstone marking can provide traceability of an item such that its origin, its owner, and its features and the like. Such marking techniques can also assist in the prevention of the counterfeiting of precious articles such as artworks or jewellery, and be of assistance in the incident of theft.

OBJECT OF THE INVENTION

It is an object of the present invention to provide a process for the marking of solid state materials, including gemstones and an identification marking which overcomes or at least partly ameliorates at least some deficiencies as associated with the prior art.

SUMMARY OF THE INVENTION

The present invention relates to a process for the authentication of gemstones, in particularly of diamond, and for which authentication marking which is invisible to the naked eye.

The present invention provides for provision of an authentication mark in/on diamond and corresponding fabrication method, which satisfies at least the following requirements within the field of diamond authentication, these being:
  (i) a truly invisible acquired authentication mark in/on diamond, which cannot be readily or easily removed;
  (ii) a truly invisible acquired authentication mark in/on diamond which satisfies the requirements of diamond owners and industry, who do not want to see any artificial mark in/on their diamond.

In a first aspect, the present invention provides A process of forming a non-optically detectable authentication marking wherein said marking is formed at the outer surface of an article formed from diamond, said process including the step of:
  (i) applying a marking at surface of the diamond using a focused ion beam (FIB) writing process so as to provide a non-optically detectable authentication marking which is formed by alteration in the optical characteristics of a portion of the diamond material at the outer surface of the diamond to form a marked portion:
    wherein the authentication marking is optically invisible, and wherein the authentication marking is viewable by an imaging method which provides an observable contrast between the portion of the diamond having altered optical characteristics and the non-marked portion of the diamond.

The ion beam source of the focused ion beam may be xenon.

The ion beam source focused ion beam may be nitrogen.

The laser back-scattering property of written part on diamond is enhanced by the focused ion beam writing process.

The acceleration voltage of the focused ion beam (FIB) may be in the range of from kV to 40 kV.

The acceleration voltage of the focused ion beam (FIB) used to formed said marking may be about 30 kV.

The focused ion beam (FIB) current used to form said marking is preferably less than 5 nA.

The focused ion beam (FIB) current used to form said marking is preferably less than about 3.3 nA.

The authentication mark is invisible to naked eye, the authentication marking is invisible to naked eye under magnification.

The authentication mark is invisible in conventional reflection, transmission, or polarized observation method.

The focused ion beam (FIB) writing process forms a marking which is formed by alteration of the refractive index of the diamond.

The authentication mark is visible in fluorescence observation method.

The authentication mark is visible using a laser scanning microscope.

In a second aspect, the present invention provides a non-optically detectable authentication marking, wherein said marking is provided at the surface of a diamond by the process according to the first aspect.

In a third aspect, the present invention provides a diamond having an authentication marking applied thereto by a process according to the first aspect.

In a fourth aspect, the present invention provides a process of viewing a non-optically detectable authentication marking on a diamond according to the first aspect, said process including the steps of:
  (i) providing a diamond having an authentication marking applied thereto according to the third aspect; and
  (ii) viewing said diamond using a fluorescence imaging method;
    wherein the authentication marking is optically invisible, and wherein the authentication marking is viewable by an imaging method which provides an observable contrast between the portion of the diamond having altered optical characteristics and the non-marked portion of the diamond.

The authentication mark may be visible in a fluorescence observation method.

The authentication mark may be visible using a laser scanning microscope.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

The accompany drawings illustrate the present invention and explain its principle. In the drawings, like reference numbers refer to like parts throughout.

DETAILED DESCRIPTION OF THE DRAWINGS

Figure 1:
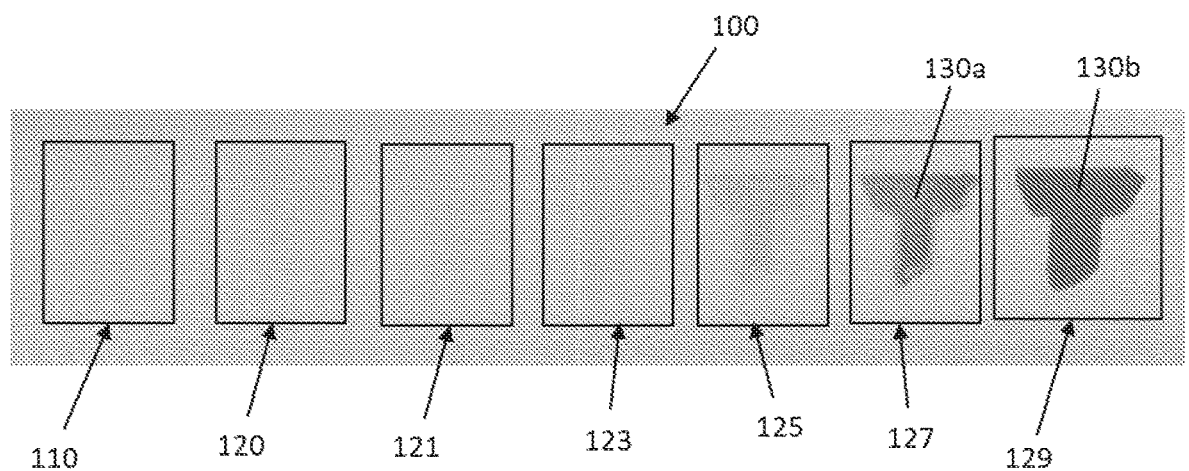
FIG. 1 shows a reflection image of an identification mark according to the present invention applied on the surface of a diamond, wherein the image is taken by smart phone camera coupled to conventional optical microscope.

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

In accordance with the present invention, an optically invisible marking is applied to the surface of a diamond.

A focused ion beam (FIB) writing process is used, which alters the optical properties of the diamond. The main optical property or characteristic which is altered is the refractive index of the diamond.

This alteration cannot be optically discernable and as such, the marking cannot be discerned, and as such is optically invisible even at magnification is viewed with a loupe for example.

In order for the mark to be seen, a fluorescence observation method is required to used, using a focused ion beam (FIB) writing process to form a marking which is formed by alteration of the refractive index of the diamond. The formation of such a marking does not alter the optical properties of the diamond, and is not optically identifiable by the naked eye, even under magnification such as with a loupe.

Such a process alters the optical properties of the diamond. The main optical property or characteristic which is altered is the refractive index of the diamond, and the marking may be considered to be represented geometrically my way of the portion of the diamond having such altered refractive index.

Accordingly, such perturbation of the refractive index of a small portion of the diamond is invisible to the naked eye. However, when the diamond is viewed by a by an imaging method which provides an observable contrast between the portion of the diamond having altered optical characteristics and the non-marked portion of the diamond.

Such an imaging method include using a laser scanning microscope for laser reflection imaging or fluorescence imaging Thus, as will be understood, the present invention provides a marking which is effectively invisible to the naked eye, yet viewable under the predetermined condition of using an appropriate imaging technique.

By way of example, a marking is applied to a diamond using the process of the present invention.

Referring to and as is shown in FIG. 1, there is a reflection image of an identification mark according to the present invention applied on the surface of a portion of a diamond 100 taken by smart phone camera coupled to conventional optical microscope.

The mark is formed from progressively increasing dosages from a focused ion beam (FIB) from left to right, by creating a marking in the form of letter "T" in regions 110, 120, 121, 123, 125, 127 and 129.

By way of example and in accordance with the present invention, a focused ion beam (FIB) using nitrogen, and with an acceleration voltage of about 30 kV and a current of about 3.3 nA or less may be used to provide a suitable dosage for forming the marking at or adjacent the surface of a diamond, in accordance with the present invention.

As can be seen, with the lowest two dosages in regions 110 and 120, the letter "T" of is indiscernible.

With the highest dosage on the contrary, the marking 130a and 130b is clearly visible under a conventional microscope in regions 127 and 129.

It is however, as will be appreciated not desirable for a security or marking or an identification marking of a diamond to be readily viewed or observed by the public, as this might allow counterfeiters to easily copy such a marking, or even remove the marking and replace it with a new one, if the marking is at the superficial layer of the diamond surface.

Furthermore, if optically visible, such a marking may affect the optical properties of a diamond and be detrimental to the value of a diamond.

As will be been marking 130a and 130b is readily discernable under a conventional microscope and thus it has low security against counterfeiting, or impropriety including theft or the like.

By contrast, in regions 110 and 120 are although not visible under a conventional microscope, it has been proven and shown by the present inventors that such markings can be readily discernable when observed by a certain method such as fluorescence imaging in accordance with the present invention. Markings as applied in regions 110 and 120 can therefore provide higher security level for diamonds over the markings of the prior art.

Figure 2:
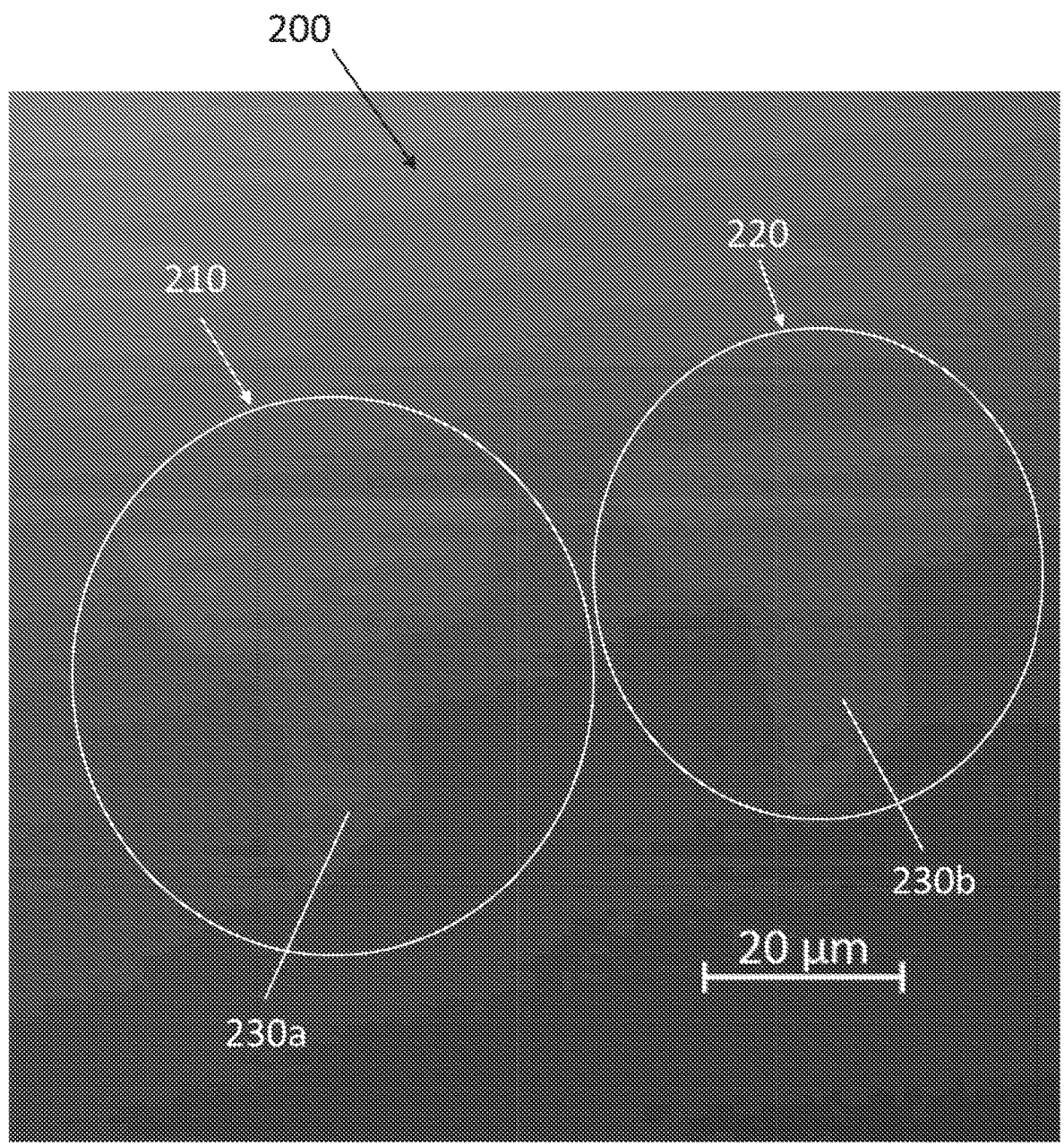
FIG. 2 shows a laser reflection image of a left-hand portion of the identification mark of FIG. 1 on the surface of the diamond taken by confocal laser scanning microscope 561 nm orange.

Now referring to FIG. 2, there is shown a laser reflection image of regions 110 and 120 of FIG. 1 of diamond 200, which are at the left hand portion of the identification markings of FIG. 1.

For the viewing of the marking, by way of example, as Microscope: Carl Zeiss LSM800 can be used as follows:
  Objective lens: Plan-Apochromat 40×, NA 1.3 Oil DIC
  Laser wavelength: 561 nm
  Laser power: 100%
  Scanning area: 106.27×106.27 um2

Figure 3:
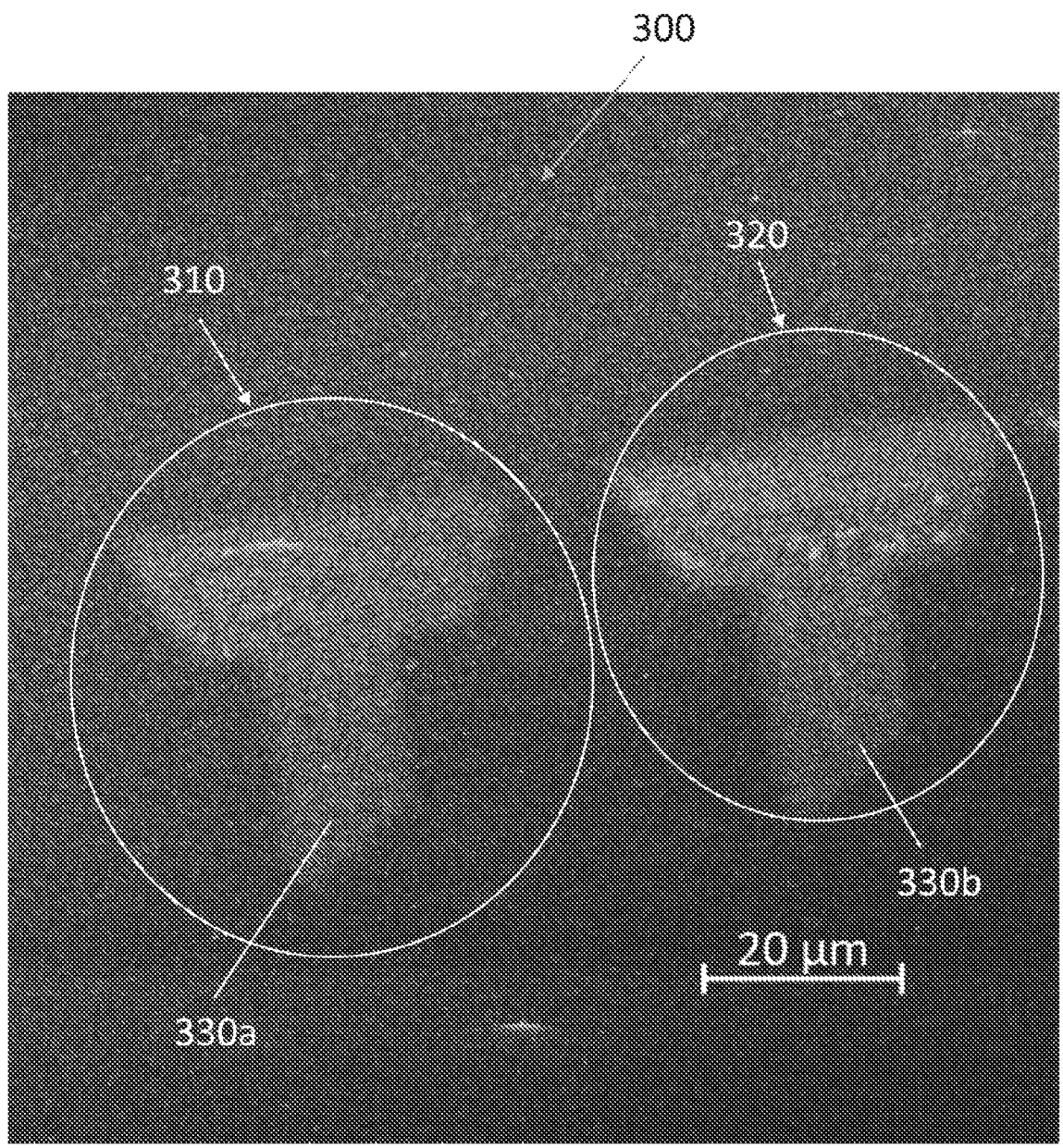
FIG. 3 shows a fluorescence image of the left-hand portion of the identification mark of FIG. 1 and FIG. 2 on the surface of the diamond taken by confocal laser scanning microscope.

Number of pixels: 1024×1024
Pixel dwell time: 32.8 us
Average: 4 lines
Detector gain: 500 for laser reflection imaging
Detection filter: for T80/R20 for laser reflection imaging
Detection wavelength: 551-571 nm for laser reflection imaging It can be seen that the two markings 230a and 230b in regions 210 and 220 respectively, which are formed by only a small dosage of focused ion beam can be noticed and detected. As such, the markings 230a and 230b as shown in FIG. 2, are optically invisible but viewable under laser reflection techniques Now referring to FIG. 3, when the same identification markings 330a and 330b corresponding to markings 230a and 230b of FIG. 2, and markings within regions 110 and 120 of FIG. 1 are observed by way of fluorescence imaging, the letter "T" of marking 330a and marking 330b are now readily discernable.

For the viewing of the marking, by way of example, as Microscope: Carl Zeiss LSM800 can be used as follows using fluorescence techniques as follows:
Microscope: Carl Zeiss LSM800
Objective lens: Plan-Apochromat 40×, NA 1.3 Oil DIC
Laser wavelength: 561 nm
Laser power: 100%
Scanning area: 106.27×106.27 um2
Number of pixels: 1024×1024
Pixel dwell time: 32.8 us
Average: 4 lines
Detector gain: 1250 for fluorescence imaging
Detection filter: MBS 458/561 for fluorescence imaging
Detection wavelength: 632-740 nm for fluorescence imaging There is significant contrast between markings 330a and 330b with the background, and thus people can easily notice and observe the markings.

As has been shown and demonstrated, the markings 330a and 330b are readily discernable under fluorescence imaging but not under a conventional microscope or a confocal laser microscope.

This is because the markings 330a and 330b are formed by irradiating a very small dosage of focused ion beam onto the diamond surface. Such small dosage of focused ion beam is not able to physically mark a diamond or be optically discernable. Rather, such marking only alters the optical characteristics such as the refractive index of the marked portion of the diamond.

This alteration cannot be optically discernable and as such, the marking cannot be discerned. In order for the marking to be seen, a fluorescence observation method is used. As is shown techniques including laser reflection image and using fluorescence observation method can be used to view a marking in accordance with the present invention.

Figure 4:
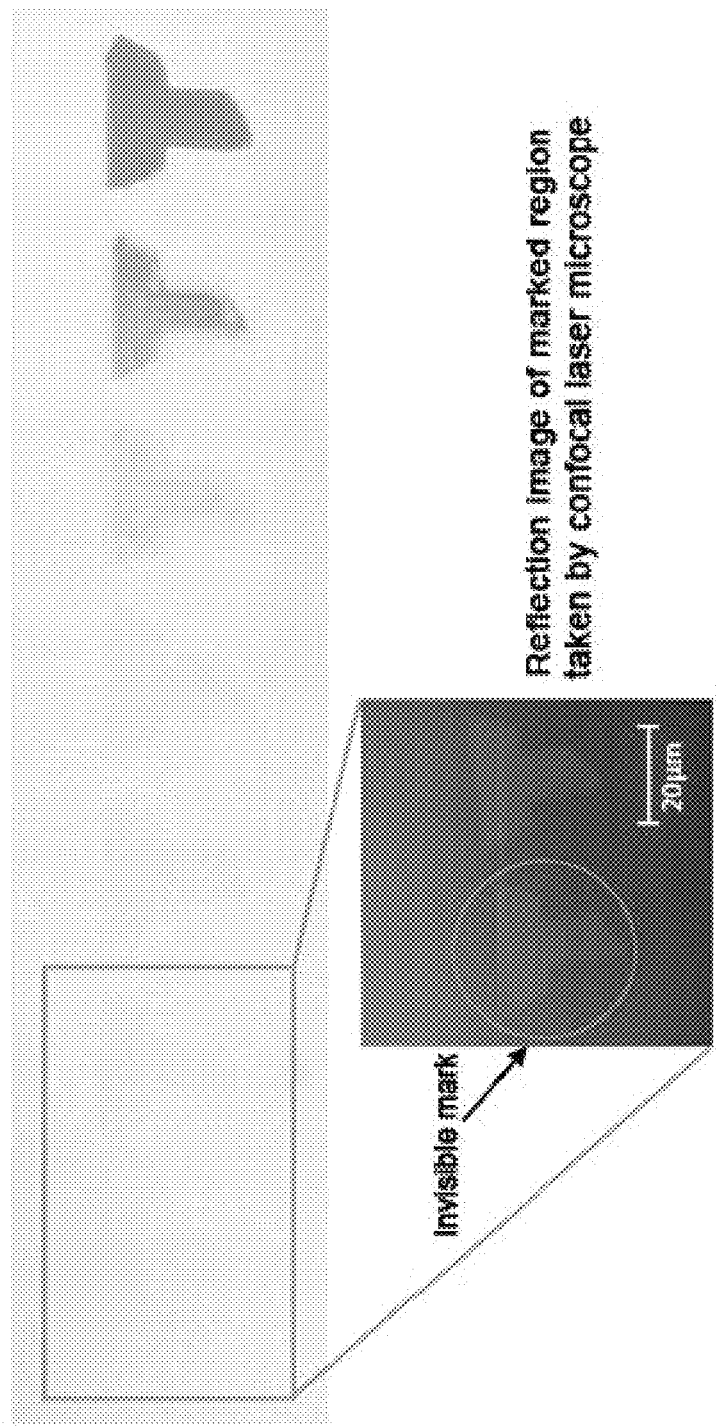
FIG. 4 provides further explanation of the viewing of the marking of FIGS. 1 to 3.

FIG. 4 provides further explanation of the viewing of the markings of FIGS. 1 and 2.

Therefore, by controlling the dosage of the focused ion beam for marking the diamond in accordance with the present invention, techniques including laser reflection image and using fluorescence observation method can be used to view a marking in accordance with the present invention.

Such advantages provide enhanced security, and provides significant technical impediments for the reproduction of the marking and as such, provides enhanced anti-counterfeiting attributes.

The marking method and marking from such method of the present invention provides the following further advantages:
(i) a marking which is not unsightly and which may not be readily viewed;
(ii) a marking which, when applied to articles such as precious stones or gemstones, allows for the identification for security purposes as well as tracking and origin of the articles;
(iii) security purposes, which may be utilized to mitigate or identify counterfeiting, and impropriety including theft and the like;
(iv) marking of a solid-state material, without the disadvantages associated with other destructive and invasive methods of marking such as ablation, milling, engraving and the like;
(v) a methodology and product thereof which does not alter the optical qualities or properties of a solid-state material, and which is not detrimental the clarity or colour of the solid-state material;
(vi) a methodology and product thereof, which does not introduce contaminants or impurities to the solid-state material;
(vii) a methodology and product thereof that requires no significant removal of material from the surface of the solid-state material; and
(viii) a methodology and product thereof, having no associated chemical residue.

It should be noted and understood that the embodiments of the present invention illustrate the idea and principle, not limitation. In these embodiments the methodology and the implementation mechanism may be modified or substituted for an efficient presentation without departing from the scope of the invention. Thus, the appended claims are not to be limited by the embodiments.

The term "marking" is used throughout the description and claims, and such a "marking" will be understood by those skilled in the art to pertain to a "mark" provided at or adjacent the surface of an article, and the terms are synonymous with each other and may be used interchangeably without alteration of meaning or interpretation.

The invention claimed is:

1. A process of forming a non-optically detectable authentication marking wherein said marking is formed at an outer surface of a diamond, said process including the step of:
(i) applying a marking at the outer surface of the diamond, said diamond having a refractive index, using a focused ion beam (FIB) writing process so as to provide a non-optically detectable authentication marking which is formed by alteration in the refractive index of a portion of the diamond at the outer surface of the diamond to form a marked portion;
wherein the authentication marking is optically invisible, and wherein the authentication marking is viewable by an imaging method which provides an observable contrast between the marked portion of the diamond and a non-marked portion of the diamond; and wherein the diamond has a laser back-scattering property and the laser back-scattering property of the marked portion of the diamond is enhanced by the focused ion beam (FIB) writing process.

2. The process according to claim 1, wherein the focused ion beam is xenon.

3. The process according to claim 1, wherein the focused ion beam is nitrogen.

4. The process according to claim 1, wherein the focused ion beam (FIB) has an acceleration voltage in a range of from 20 kV to 40 kV.

5. The process according to claim 1, wherein the focused ion beam (FIB) has an acceleration voltage used to form said marking of 30 kV.

6. The process according to claim 1, wherein the focused ion beam (FIB) has a current used to form said marking which is less than 5 nA.

7. The process according to claim 1, wherein the focused ion beam (FIB) has a current used to form said marking which is less than 3.3 nA.

8. The process according to claim 1, wherein the authentication marking is optically invisible under magnification.

9. The process according to claim 1, wherein the authentication mark is optically invisible in a reflection, transmission, or polarized observation method.

10. The process according to claim 1, wherein the authentication mark is visible in fluorescence observation method.

11. The process according to claim 1, wherein the authentication mark is visible using a laser scanning microscope.

12. A diamond having a refractive index and having an authentication marking formed on an outer surface of the diamond, wherein the authentication marking is an optically invisible authentication marking, and wherein the authentication marking is provided by alteration of the refractive index of a portion of the diamond at the outer surface of the diamond to form a marked portion; and wherein the authentication marking is viewable by an imaging method which provides an observable contrast between the marked portion of the diamond and a non-marked portion of the diamond; and wherein the diamond has a laser back-scattering property and the laser back-scattering property of the marked portion of the diamond is enhanced by a focused ion beam (FIB) writing process.

13. A process of viewing a non-optically detectable authentication marking on a diamond, said process including the steps of:
  (i) providing a diamond having an authentication marking applied thereto according to claim 12; and
  (ii) viewing said diamond using an imaging method;
    wherein the authentication marking is viewable by an imaging method which provides an observable contrast between the marked portion of the diamond and the non-marked portion of the diamond, and wherein the diamond has a laser back-scattering property and the laser back-scattering property of the marked portion of the diamond is enhanced by a focused ion beam (FIB) writing process.

14. The process according to claim 13, wherein the authentication mark is visible in fluorescence observation method.

15. The process according to claim 13, wherein the authentication mark is visible using a laser scanning microscope.

* * * * *